(12) United States Patent
Rottmerhusen

(10) Patent No.: US 7,675,254 B2
(45) Date of Patent: Mar. 9, 2010

(54) ELECTRIC DRIVE FOR A VEHICLE

(75) Inventor: Hans Hermann Rottmerhusen, Tellingstedt (DE)

(73) Assignee: Audi AG, Ingolstadt (DE)

( * ) Notice: Subject to any disclaimer, the term of this patent is extended or adjusted under 35 U.S.C. 154(b) by 735 days.

(21) Appl. No.: 11/630,332

(22) PCT Filed: Jun. 21, 2005

(86) PCT No.: PCT/DE2005/001106

§ 371 (c)(1),
(2), (4) Date: Dec. 21, 2006

(87) PCT Pub. No.: WO2006/000192

PCT Pub. Date: Jan. 5, 2006

(65) Prior Publication Data

US 2007/0252543 A1    Nov. 1, 2007

(30) Foreign Application Priority Data

Jun. 24, 2004    (DE) .................. 10 2004 030 460

(51) Int. Cl.
*H02P 3/08* (2006.01)
(52) U.S. Cl. .................. 318/254.1; 318/701; 318/703; 318/381
(58) Field of Classification Search ............. 318/700, 318/701, 704, 254.1, 246, 703, 379, 381
See application file for complete search history.

(56) References Cited

U.S. PATENT DOCUMENTS

| | | | | |
|---|---|---|---|---|
| 4,422,021 A | * | 12/1983 | Schwarz | 318/376 |
| 5,115,181 A | * | 5/1992 | Sood | 318/701 |
| 5,543,674 A | | 8/1996 | Koehler et al. | |
| 5,753,989 A | | 5/1998 | Syverson et al. | |
| 6,013,993 A | * | 1/2000 | Barbisch | 318/379 |
| 6,014,001 A | * | 1/2000 | Guinet | 318/701 |
| 6,646,406 B1 | * | 11/2003 | Pollock et al. | 318/599 |
| 6,867,561 B1 | * | 3/2005 | Pollock et al. | 318/400.2 |
| 7,429,840 B2 | * | 9/2008 | Pollock et al. | 318/254.1 |
| 2004/0046519 A1 | | 3/2004 | Leonardi et al. | |
| 2005/0245183 A1 | * | 11/2005 | Deshpande et al. | 451/357 |

* cited by examiner

*Primary Examiner*—Walter Benson
*Assistant Examiner*—Eduardo Colon
(74) *Attorney, Agent, or Firm*—Novak Druce & Quigg LLP

(57) ABSTRACT

Disclosed is an electric drive for a vehicle, which is used as a main drive or a hybrid drive. The electric motor of said drive is embodied as a special type of reluctance motor or series wound motor. The rotor of the reluctance motor and the inverse speed motor is provided with an excitation winding to which a transistor is assigned that allows the motor to be braked in a sensitive manner so as to control the field current. The braking current is fed to the source of current by switching operation of the motor during generator operation.

18 Claims, 4 Drawing Sheets

ELECTRIC DRIVE FOR A VEHICLE

Figure 1:
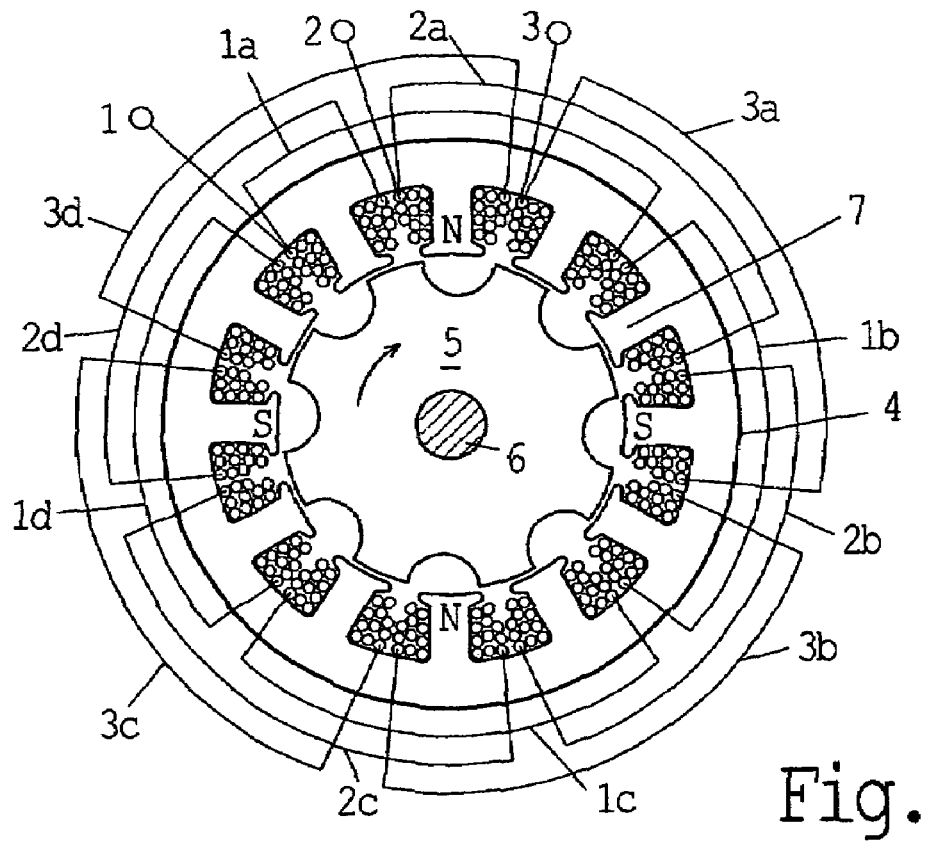

This application is a U.S. National Stage of PCT/DE2005/001106, having been filed Jun. 21, 2005, which claims priority from DE 102004030460.2-32, having been filed on Jun. 24, 2004, each of which is hereby incorporated by reference in its entirety.

The invention relates to an electric drive for a vehicle as claimed in claims 1 and 2.

In motor vehicles electric motors are being used with greater frequency to support the drive (hybrid drive) or as the main drive.

Electromotive drives such as these require very high starting and torque in both directions of rotation. An electronically commuted PM motor meets these requirements.

A motor equipped with permanent magnets is expensive to produce, and limited in power input by the permanent magnets.

DE 102 15 126 A1 discloses a propulsive drive for an electrical battery-driven industrial truck in which a reluctance motor is used as the propulsive motor. This propulsive motor also is to be operable in the braking mode. A corresponding description for the technical solution of braking operation cannot be inferred from this document.

WO 97/01 882 A1 discloses a brushless electric motor. It has a stator with a plurality of stator teeth which are wound with coils of winding phases. The rotor consists of a conductive piece element which is excited by a stationary coil. Both the coils of the stator and also the field coils for the rotor are supplied with current from an electronic control device, the field coil being supplied with current both in motor and also in generator operation. This motor in a narrower sense is not a reluctance motor.

DE 199 19 684 A1 discloses a reluctance motor with a rotor magnetized by a stator-side winding which is in series to the electronic switches of the commutation circuit. There are no statements at all regarding use of these configurations in braking operation in this document either.

The document of Mueller: Electric Vehicle Drives, 1960, pp, 44, 45, describes that a series motor in regenerative braking exhibits unstable behavior; and as a remedy the outside excitation of the field winding in this operating state by means of an motor-exciter set or a battery or a generator is suggested.

The document of SenGupta, S.; Bhadra, S. N.; Chattopadhyay, A. K.: "An inverter-fed-self-controlled "brushless" DC series motor with the field winding in the DC link," Proceedings of the 1996 International Conference on Power Electronics, Drives and Energy Systems for Industrial Growth, 1996, Volume: 1, Jan. 8-11, 1996 pages: 367-372, describes an electronically commutated series motor which has a stator with a three-phase winding. The rotor bears a field winding and there is an electronic control device for commutation of the winding phases.

The document of W. A. M. Ghoneim, J. E. Fletcher and B. W. Williams: "Linear analysis of two-, three-, and four-phase switched reluctance machines with variable pitched winding configurations," IEEE Proc. Electr. Power Appl., Vol. 150, No. 3, May 2003, pp. 319-343, describes a reluctance motor which has a stator with three winding phases which are located on six stator teeth and consist of two coils each, and the rotor is made four-pole. Each of the coils of the winding phases encloses two stator teeth (for example C1-C1', C4-C4' ... in FIG. 5a). The winding phases are triggered either by way of three asymmetrical H-bridges (section 5.2.2a on p. 328), one H-bridge and two asymmetrical H-bridges (section 5.2.2b) or two H-bridges and one asymmetrical H-bridge, and all three winding phases are in contact with the same current source simultaneously according to FIG. 5a. FIG. 6a shows a stator on which there is a three-phase winding as a full-pitch winding. Here all three winding phases are in contact with the same current source simultaneously according to FIG. 6a.

The disadvantage in this design of the reluctance motor is especially the complex wiring of the winding phases.

The document of Jin-Woo Ahn, Seok-Gyu Oh, Jae-Won Moon, Young-Moon Hwang: "A Three-Phase Switched Reluctance Motor with Two-Phase Excitation," IEEE TRANSACTIONS OF INDUSTRY APPLICATIONS, Vol. 35, No. 5Z, September/October 1999, pp. 1067-1075, describes a reluctance motor in which the stator has six stator teeth and around each stator tooth there is a coil of the three-phase stator winding, one bridge circuit being associated with the winding phases, the winding phases being retained in a star connection. The stator winding is triggered by way of a half-bridge circuit such that during motor operation a uniform pole field is produced on two respective adjacent stator teeth, the pole fields having pole fields opposite one another.

The object of the invention is to devise an electric drive for a vehicle which by means of a corresponding configuration of the winding phases on the stator has a high energy density on the stator teeth and on the entire rotor periphery there is a torque, and which achieves a high starting torque and torque in both directions of rotation at a continuous torque in each rotor position of each rotor revolution and with which the braking energy of the motor is supplied to the current source by way of the electronic control device of the motor.

This object is achieved by the features of claims 1 and 2. Other embodiments of the invention are specified in the dependent claims.

The solution claimed for the invention presents the advantages that an electric drive for a vehicle has been devised in which the coils of the winding phases are configured on the stator such that a high field density for each rotor step is achieved on the respective stator teeth and on the entire rotor periphery a high, uniform torque is present in each rotor position of each rotor revolution. This electric drive is furthermore characterized by quiet running behavior with low noise development and is used to advantage in a hybrid drive or a main drive, the braking torque being precisely adjustable by way of an electronic control device and the braking energy being fed into the current source.

The invention will be described below using the drawings.

Figure 2:
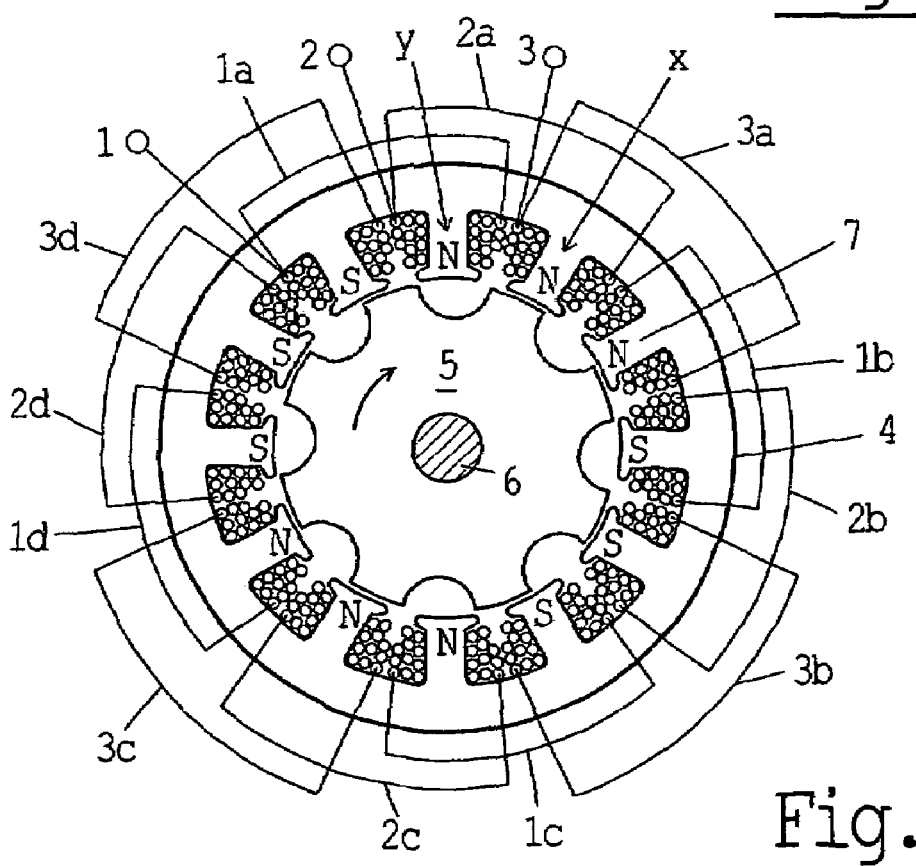
Figure 3:
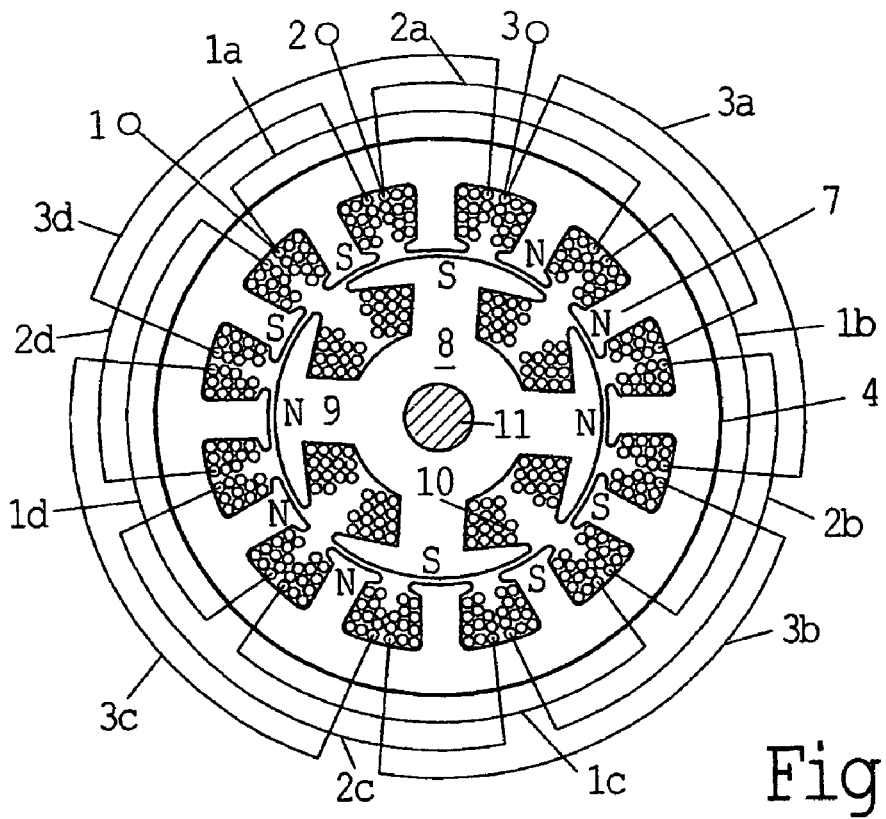
Figure 4:
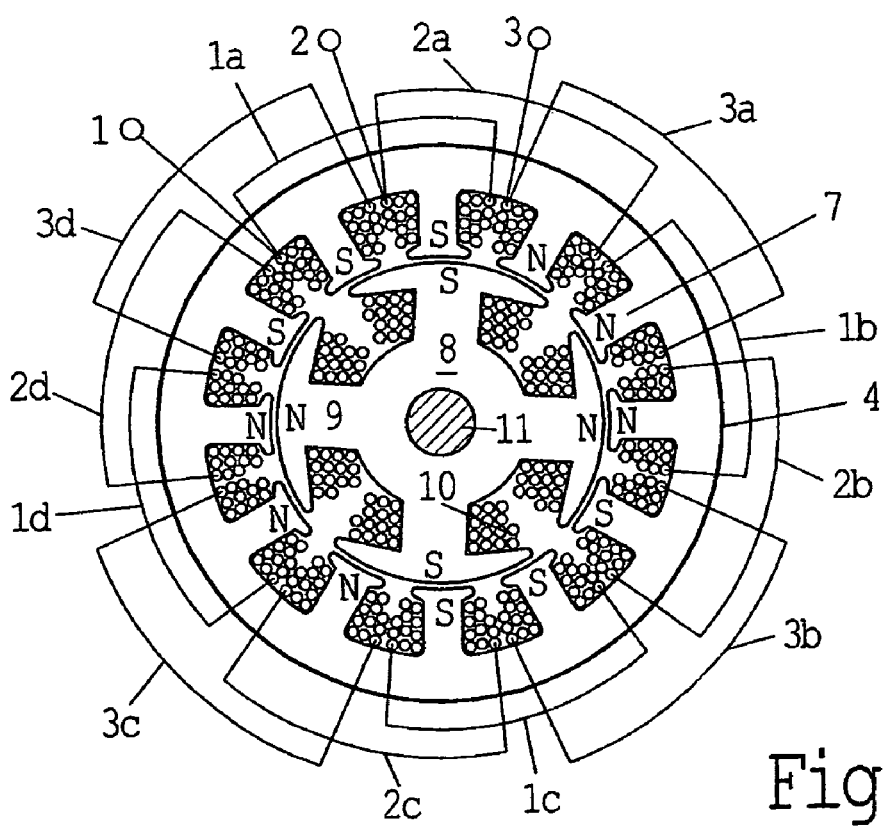
Figure 5:
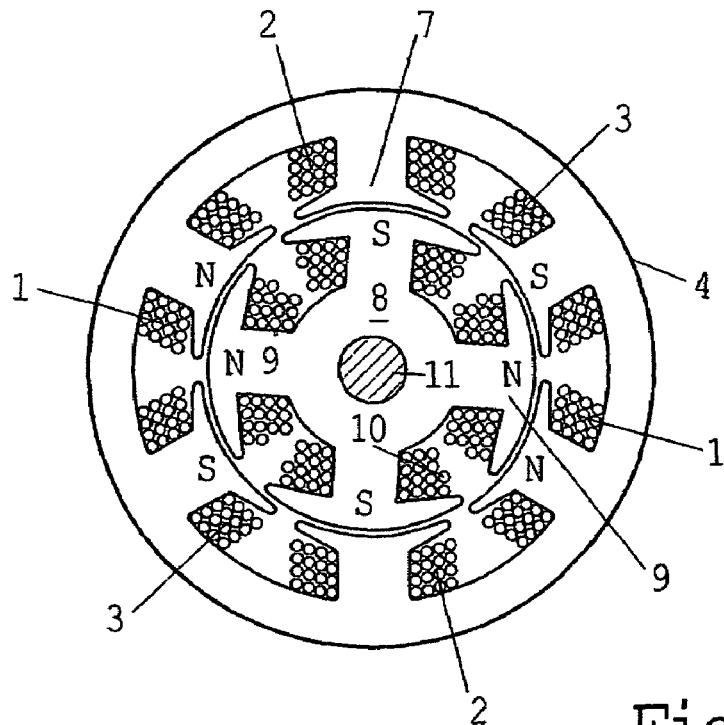
Figure 6:
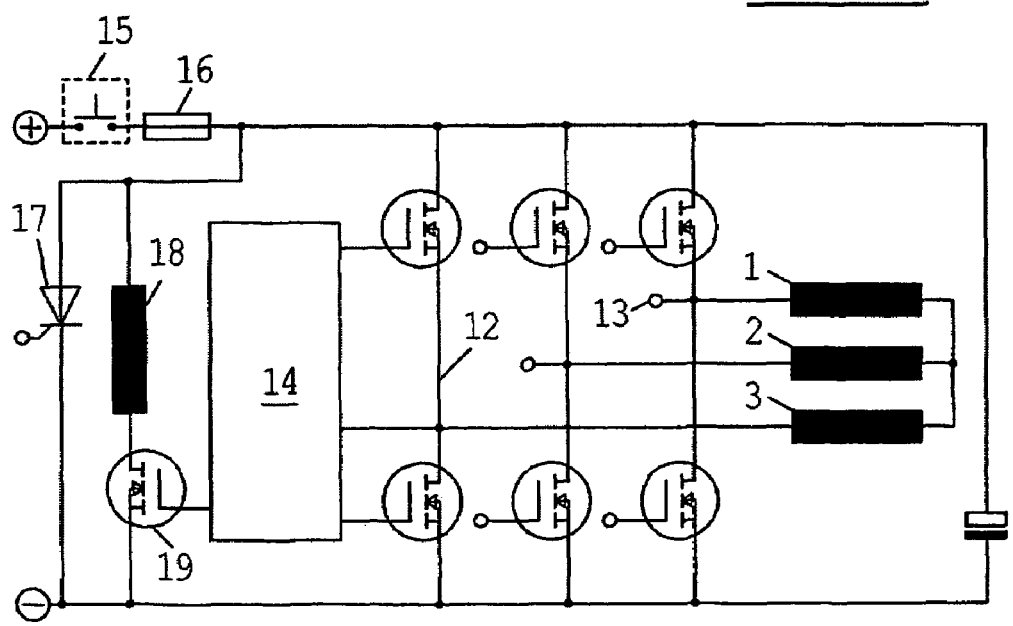
Figure 7:
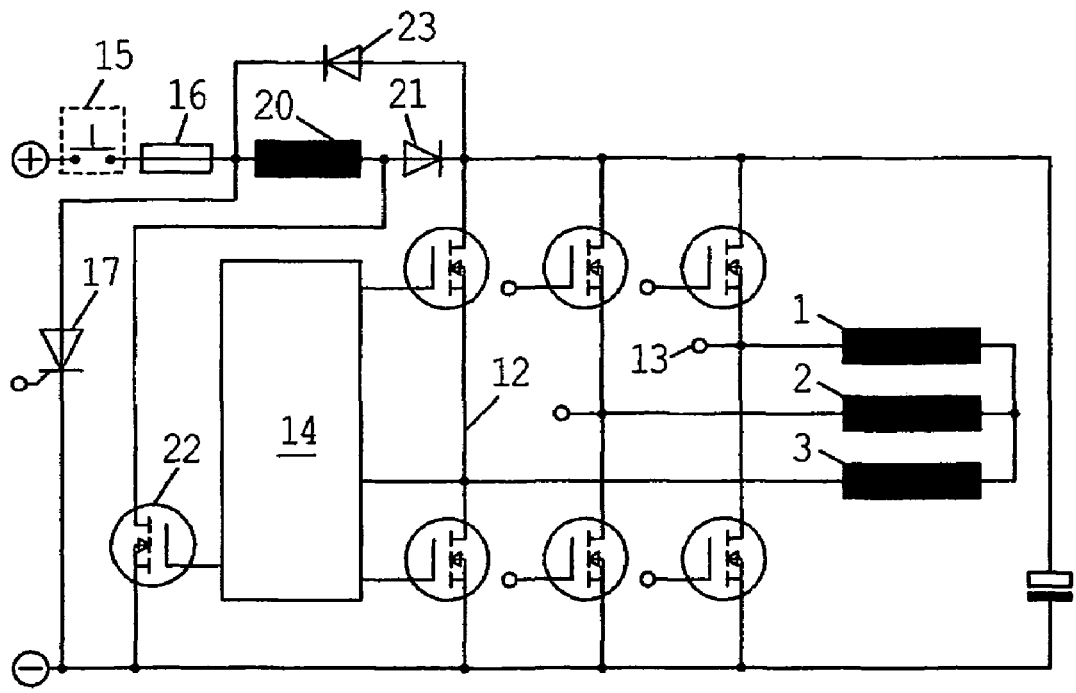
Figure 8:
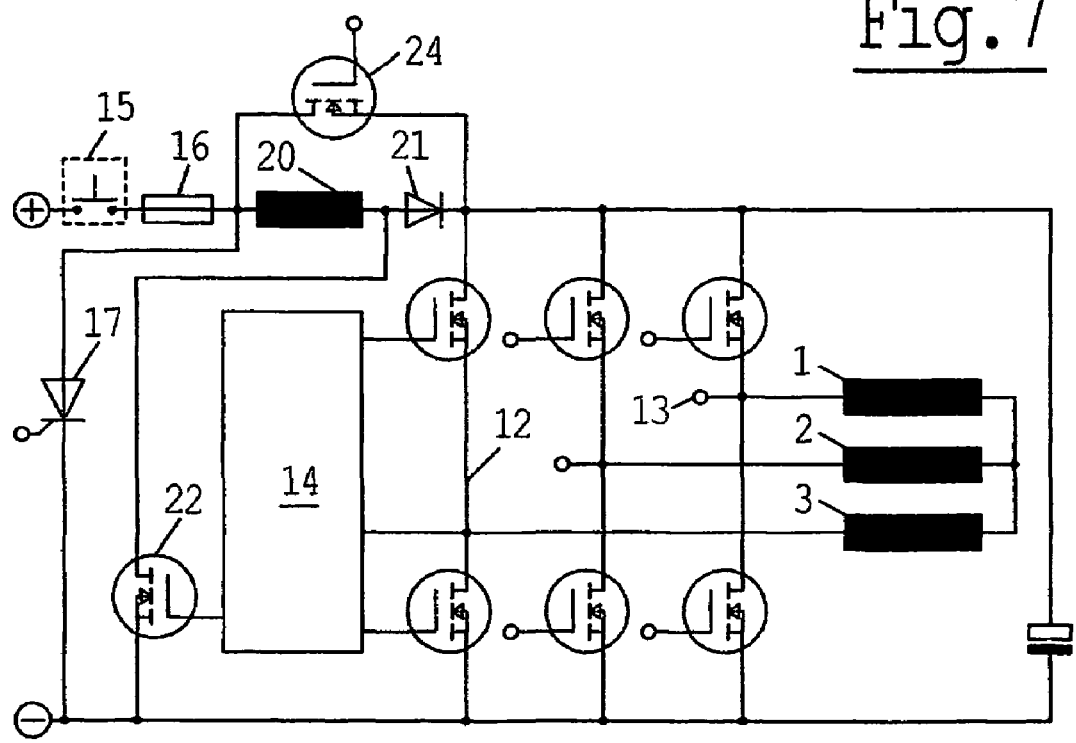

FIG. 1 shows a representation of the stator and rotor of a reluctance motor in an axial elevational view, FIG. 2 shows a representation of the stator and rotor of another reluctance motor in an axial elevational view, FIG. 3 shows a representation of the stator and rotor of a series motor in an axial elevational view, FIGS. 4 and 5 show representations of the stator and rotor of other series motors in an axial elevational view, FIGS. 6, 7 and 8 show circuit configuration of the electronic control device for commutation of the reluctance motor and the series motor.

FIG. 1 shows in an axial elevational view an illustration of a reluctance motor of a special type with phases 1, 2, 3 of the field winding on the stator 4 and with an eight-pole rotor 5 on the shaft 6. The stator in a four-pole design of the winding phases 1, 2, 3 has twelve stator teeth 7 pointed toward the rotor 5, and the winding phases each contain four coils, which are each identified with a, b, c, d. Each of the coils of the winding phases encloses three stator teeth 7, the four coils of one winding phase being mounted side by side on the stator by one coil side of one coil and the other coil side of the adjacent coil being located in a common groove.

The winding phases are on the one hand in contact with a current source such that pole formation toward the rotor takes place on every third stator. tooth 7 by two-third of the field of the coils a, b, c, d, of two winding phases being superimposed, for which purpose the reluctance motor is associated with a standard circuit configuration of the electronic control device for a reluctance motor. FIG. 1 shows the pole formation illustrated with N and S on the stator when the winding phases 2 and 3 are in contact with a current source. This configuration of the winding phases on the stator achieves a very high energy density on the respective stator teeth and a uniform torque during each rotor revolution and good cooling of the coils by way of the winding overhangs. For this purpose the motor should be designed to be at least four-pole, and depending on the size of the motor, a higher pole pair number can be selected.

On the other hand, the winding phases are in contact with the current source so that a pole to the rotor is formed on two adjacent stator teeth, which adjacent to each other exhibit the same pole formation, by one third of the field of the coils a, b, c, d, of two winding phases being superimposed, and by the winding phases being retained in a star connection, for which a bridge circuit of the electronic control device is associated with the reluctance motor. In this application of winding phases to the current source during commutation of the winding phases a circular rotary field is formed on the stator, on each stator tooth, there being torque, and the motor being characterized by quiet and easy rotary behavior.

FIG. 2 shows in an axial elevational view an illustration of the reluctance motor in which each of the coils a, b, c, d of the winding phases 1, 2, 3 enclose two stator teeth 7, and the intermediate space from one coil to the next coil of a winding phase is one stator tooth, and the winding phases are retained in a star connection, poles formation toward the rotor on each stator tooth taking place with central pole formation of the respective pole fields. Pole formation is identified as N and S. In this instance as well during commutation of the winding phases by means of a bridge circuit of the electrical control device a circular rotary field is formed on the stator. In this configuration of the coils of the winding phases on the stator, no superposition of coils a, b, c, d takes place and torque is applied to each rotor tooth during switching from one rotor step to the next rotor step. FIG. 2 illustrates this rotor position.

Central pole formation of the respective pole fields is identified by an x, the corresponding polarization on each stator tooth being already present, for the next central pole formation y for the next rotor step.

A configuration such as this of the coils a, b, c, d of the winding phases 1, 2, 3 on the stator and the corresponding wiring results in achievement of high starting torque and uniform torque in each rotor position of each rotor during rotor revolution. This effects quiet running behavior of the motor.

A configuration such as this of the winding phases on a stator in a reluctance motor results in very high energy density on the respective stator teeth, so that high starting torque and torque on the rotor are achieved, and accordingly a reluctance motor such as this is used to advantage in a vehicle.

A reluctance motor of the above describe type according to FIGS. 1 and 2 can also be operated shunted and thus is used both as a hybrid motor and also for the main drive for a vehicle by the rotor 5 being provided with a corresponding field winding which is supplied during braking operation by way of slip rings with a controllable field current, in this connection the coils of the winding phases 1, 2, 3 also enclosing only one stator tooth 7 each.

A stator structure such as that shown in FIGS. 1 and 2 with the appropriate configuration of the winding phases on the stator for a reluctance motor is also used to advantage in a series motor.

FIGS. 3 and 4 illustrate such a series motor. The rotor 8 has four rotor teeth 9 on which the coils 10 of the exciter winding are mounted, and each of the coils 10 of the exciter winding encloses a rotor tooth. The exciter winding is connected to slip rings which are mounted on the shaft 11 of the rotor 8. The configuration of the coils a, b, c, d of the winding phases 1, 2, 3 for the series motor corresponds to the configuration of the winding phases in the reluctance motor (FIGS. 1 and 2), the winding phases in a series motor always being retained in a star connection. As is shown in FIG. 3, each of the coils a, b, c, d of the winding phases 1, 2, 3 encloses three stator teeth 7. In this instance the winding phases are connected to a current source so that each of the coils is superimposed to the extent of one third and assumes the pole formation on the stator shown in FIG. 3.

In FIG. 4 each of the coils a, b, c, d of the winding phases 1, 2, 3 encloses two stator teeth 7. In this instance as well, the configuration of the coils of the winding phases corresponds to the configuration of the coils of the winding phases in a reluctance motor, there being no superposition of the coils, the pole formation toward the rotor taking place on each stator tooth. The winding phases of the reluctance motor as shown in; FIGS. 3 and 4 are always supplied with current by way of a bridge circuit such that a circular rotary field is formed on the stator.

A series motor as shown in FIGS. 3 and 4 is also characterized by quiet, easy rotary behavior, and very high starting torque and uniform torque being achieved for each rotor position of each rotor revolution.

FIG. 5 shows in an axial elevational view an illustration of another series motor with phases 1, 2, 3 of the field winding on the stator 4. In this instance each of the coils of the winding phases encloses a stator tooth 7. The rotor 8 corresponds to the rotor as shown in FIGS. 3 and 4. In this instance as well the winding phases are connected in a star formation, a bridge circuit of the electronic control device being associated with the winding phases, and a circular rotary field is formed on the stator.

A series motor of the above described type according to FIGS. 3, 4 and 5 can also be operated shunted and is used especially advantageously in a hybrid drive for a vehicle, because with this motor very high braking torques can be achieved, by cancelling motor operation and initiating generator operation and feedback of the braking energy to the current source takes place.

The above described motors can be designed also with any pole pair numbers.

The above cited motors of the special type can be operated with the same circuit configuration of the electronic control device.

FIGS. 6, 7 and 8. illustrate a circuit configuration of the electronic control device for commutation of the winding phases of the reluctance motor or of the series motor. Each of the winding phases 1, 2, 3 are connected to one end on a transistorized half-bridge 12, while the winding phases are star connected to the other end. In order that occurrence of an error on the half-bridges of the electronic control device or in a motor can be rapidly detected, a measurement shunt may be connected between the half-bridges 12 and the winding phases 1,2,3, or there is a potential tap 13 on each of the half-bridges 12. When an error event is detected on the half-bridges 12 or in the motor by the control unit 14, the motor is separated from the current source either by means of a relay 15 or by short-circuiting of the current source downstream from a relay 16 by means of a thyristor 17. For the reluctance motor short-circuiting of the current source by the thyristor in the event of an error in the bridge circuit is not necessary, since the current source may be short-circuited directly by way of the half-bridges, in the event of a defect in the half-bridges.

In particular FIG. 6 shows a circuit configuration for a reluctance motor, the winding phases 1, 2, 3 being retained in a star connection. For braking operation and feed of the braking current into the current source the rotor of the reluctance motor is provided with a field winding 18 which is connected in a shunt by the field winding being connected parallel to the half-bridges 12 and the field winding 18 being connected upstream from a transistor 19.

With the transistor 19 for controlling the field current of the field winding 18, precision braking operation of the reluctance motor can be controlled, and the braking current is fed into the current source by way of the free-wheeling diodes of the half-bridges 12.

FIG. 7 shows a circuit configuration for a series motor. The field winding 20 of the rotor of the series motor is connected upstream from the half-bridges, and the field winding may be connected shunted during braking operation by a transistor 22 being connected in front of a diode connected downstream from the field winding 20 for return of the current source and a free-wheeling diode 23 being connected parallel to the field winding following the diode 21 connected downstream from the field winding.

With the transistor 22 for controlling the field current for the field winding, precision braking operation can be controlled, and the braking current is supplied into the current source by way of the free-wheeling diodes of the half-bridges and the free-wheeling diode 23 of the field winding.

FIG. 8 shows a circuit configuration for a series motor which can be operated both in series and also shunted by a transistor 22 being connected to the return conductor of the current source upstream from a diode 21 connected downstream from the field winding 20 and another transistor 24 with a free-wheeling diode being connected parallel to field winding following a diode 21 which is connected downstream from the field winding.

With a circuit configuration such as this the motor can be operated as a series motor or as a shunt motor and feeding into the current source can take place during braking operation.

In the electromotive drives proposed in the foregoing for a vehicle, the reluctance motor and the series motor as generator are ineffective in the event of an error, nor does the rotor of these motors apply braking torque, since the rotor is not provided with permanent magnets. In contrast, a motor with a rotor provided with permanent magnets exerts braking torque even if the motor is separated from the current source.

Use may be made by preference of transistors for detecting an error on the half-bridges or in the motor, transistors in which self-detection of the functional capability of the transistors is incorporated in the transistors, or the functional capability is monitored by the control unit 15.

The invention claimed is:

1. A drive for a vehicle as the main drive or as a hybrid drive, comprising:
   an electric motor with a stator and
   a rotor and an electronic control device which can be connected to a current source for commutation of the winding phases of the electric motor,
   the electric motor being a reluctance motor of special type, for the stators of which each of the coils (a, b, c, d) of the winding phases encloses a plurality of stator teeth or one stator tooth,
   the rotor comprising a field winding and
   an electronic control device having a number of half-bridges corresponding to the number of winding phases with free-wheeling diodes, and
   field winding of the rotor being connected to the current source by way of a transistor in braking operation and thus by controlling the field current of the field winding precision braking operation of the reluctance motor can be carried out and the braking current which forms in the winding phases is supplied to the current source by way of the free-wheeling diodes of the half-bridges.

2. The electric drive as claimed in claim 1, wherein each of the coils (a, b, c, d) of the winding phases encloses two stator teeth and the winding phases are retained in a star connection, pole formation toward the rotor occurring on each stator tooth with central pole formation of the respective pole fields, and a circular rotary field being produced on the stator.

3. The electric drive as claimed in claim 1, wherein each of the coils (a, b, c, d) of the winding phases encloses three stator teeth, the coils of the winding phases being mounted side by side on the stator and one side of one coil and one side of a coil of adjacent coils of a winding phase being positioned in a common groove.

4. The electric drive as claimed in claim 1, wherein the winding phases of the reluctance motor or the series motor are in contact with a current source in such a way that each pole formation toward the rotor occurs on two adjacent stator teeth of the same polarity, and the circuit configuration of the electronic control device containing a bridge circuit and the winding phases having a star connection and a circular rotary field being generated on the stator.

5. The electric drive as claimed in claim 1, wherein the winding phases of the reluctance motor are in contact with a current source such that pole formation toward the rotor takes place on every third stator tooth by a standard circuit configuration for the reluctance motor being associated with the electronic control device.

6. The electric drive as claimed in claim 1, wherein, for the purpose of detecting an error event in the half-bridges, use is made of transistors in which self-detection of the functional capability of the transistors is integrated into the transistors, or the functional capability of the transistors is monitored by the control unit.

7. The electric drive as claimed in claim 1, further comprising measurement shunts for the purpose of detecting an error event in the electronic control device and in the electric motor.

8. The electric drive as claimed in claim 1, wherein potential taps are mounted in the electronic control unit and in the electric motor for the purpose of detecting an error event in the circuit configuration.

9. A drive for a vehicle as the main drive or as a hybrid drive, having an electric motor with a stator and a rotor and an electronic control device which can be connected to a current source for commutation of the winding phases of the electric motor,
   wherein the electric motor is a reluctance motor of special type, for the stators of which each of the coils (a, b, c, d) of the winding phases encloses a plurality of stator teeth or one stator tooth,
   the rotor having a field winding with coils which each enclose one rotor tooth (9), the electronic control device having a number of half-bridges corresponding to the number of winding phases with free-wheeling diodes, and the field winding being series connected on the one hand to one pole of the current source and on the other by way of a diode poled in the forward direction to a first feeding point of the half-bridges of the electronic control device which have a second feeding point series connected to the other pole of the current source, and the terminal of the field winding of the rotor connected to the diode can be connected by way of a transistor in braking operation to the other pole of the current source and thus by controlling the field current of the field winding precision braking operation of the electric motor can be carried out and the braking current which forms in the winding phases (1, 2, 3) being supplied to the current source by way of the free-wheeling diodes of the half-bridges and a free-wheeling diode connected parallel to the diode and the field winding.

10. The electric drive as claimed in claim 9, wherein the series motor can be operated both in series and also shunted by a transistor being connected parallel to the half-bridges in front of a diode connected downstream from the field winding, and by a relay being connected to a free-wheeling diode or a transistor being connected parallel to a free-wheeling diode of the field winding.

11. The electric drive as claimed in claim 9, wherein each of the coils (a, b, c, d) of the winding phases encloses three stator teeth, the coils of the winding phases being mounted side by side on the stator and one side of one coil and one side of a coil of adjacent coils of a winding phase being positioned in a common groove.

12. The electric drive as claimed in claim 11, wherein the winding phases of the reluctance motor are in contact with a current source such that pole formation toward the rotor takes place on every third stator tooth by a standard circuit configuration for the reluctance motor being associated with the electronic control device.

13. The electric drive as claimed in claim 11, wherein the winding phases of the reluctance motor or the series motor are in contact with a current source in such a way that each pole formation toward the rotor occurs on two adjacent stator teeth of the same polarity, and the circuit configuration of the electronic control device containing a bridge circuit and the winding phases having a star connection and a circular rotary field being generated on the stator.

14. The electric drive as claimed in claim 9, wherein the winding phases of the reluctance motor or the series motor are in contact with a current source in such a way that each pole formation toward the rotor occurs on two adjacent stator teeth of the same polarity, and the circuit configuration of the electronic control device containing a bridge circuit and the winding phases having a star connection and a circular rotary field being generated on the stator.

15. The electric drive as claimed in claim 9, wherein, for the purpose of detecting an error event in the half-bridges, use is made of transistors in which self-detection of the functional capability of the transistors is integrated into the transistors, or the functional capability of the transistors is monitored by the control unit.

16. The electric drive as claimed in claim 9, further comprising measurement shunts for the purpose of detecting an error event in the electronic control device and in the electric motor.

17. The electric drive as claimed in claim 9, wherein potential taps are mounted in the electronic control unit and in the electric motor for the purpose of detecting an error event in the circuit configuration.

18. The electric drive as claimed in claim 9, wherein each of the coils (a, b, c, d) of the winding phases encloses two stator teeth and the winding phases are retained in a star connection, pole formation toward the rotor occurring on each stator tooth with central pole formation of the respective pole fields, and a circular rotary field being produced on the stator.

* * * * *